Jan. 20, 1970          J. A. CWIK          3,490,259

TUBE BENDING MANDREL

Filed Sept. 13, 1967          5 Sheets-Sheet 3

INVENTOR
JOSEPH A. CWIK

BY *Sheridan and Ross*

ATTORNEYS

Jan. 20, 1970      J. A. CWIK      3,490,259

TUBE BENDING MANDREL

Filed Sept. 13, 1967      5 Sheets-Sheet 5

INVENTOR
JOSEPH A. CWIK
BY *Sheridan and Ross*

ATTORNEYS

United States Patent Office 3,490,259
Patented Jan. 20, 1970

3,490,259
TUBE BENDING MANDREL
Joseph A. Cwik, Arvada, Colo., assignor, by mesne assignments, to Teledyne, Inc., Los Angeles, Calif., a corporation of Delaware
Filed Sept. 13, 1967, Ser. No. 667,505
Int. Cl. B21d 1/08; B21c 1/24
U.S. Cl. 72—113                                  28 Claims

ABSTRACT OF THE DISCLOSURE

A mandrel for use in an apparatus for draw forming tubes, said mandrel utilizing one or more rotatably mounted roller elements to minimize the problems associated with high-frictional interface forces. Each roller element is mounted for rotation with respect to a part of the mandrel. Each roller element has a surface portion constructed for engaging the inner surface of the outer wall of a tube during the draw forming operation whereby movement of the outer wall of the tube during the draw forming operation causes the roller element to rotate about an axis lying in a plane disposed generally perpendicularly to the longitudinal axis of the mandrel. The mandrel may also include a flexible body portion comprising a plurality of ring members, each ring member having one or more rotatably mounted roller elements, and means for maintaining, during the draw forming operation, a surface portion of each roller element of each ring member in contact with a portion of the inner surface of a tube wall. The flexible body portion of the mandrel may include ring members formed of laminated construction.

BACKGROUND OF THE INVENTION

It has long been considered desirable to reduce the amount of friction encountered between the surfaces of the mandrel and the tube walls during the draw forming operation while at the same time providing adequate support to the stressed portions of the tube walls undergoing deformation. The existence of large frictional forces is disadvantageous for a number of reasons. For example, such friction increases the difficulty of positioning a mandrel within a tube prior to the draw forming operation; it decreases the speed at which draw forming may be performed; it adversely affects the longevity of the mandrel due to accelerated surface wear occurring as a result of static frictional loads and due to the increased tensile loads imposed upon various parts of the mandrel such as the link members; it increases the chance of the wall tube fracturing due to high tensile stresses imparted to the tube wall during the draw forming operation; it minimizes or eliminates galling or spalling; and it increases the length of the tube required to be positioned between the bend and clamp dies in order to insure that the tube does not slip relative to said dies during the draw forming operation. It will be appreciated that with a reduction in friction it will be much easier to load the mandrel within the tube and, thus, minimize the difficulties heretofore encountered in positioning accurately a mandrel relative to the bend die. Work hardening, which is a toughening of the metal or compaction of the grain structure that occurs when the metal has been subjected to a compressive type stress, is, in tube draw forming operations, generally proportional to the amount of friction encountered. With a reduction in friction, it is possible to increase the rate of draw forming without adverse consequences. The longevity of a mandrel is increased due to a reduction in friction since the wear and tear on the mandrel surfaces is greatly minimized and since the various parts of the mandrel, such as the links interconnecting the ring members of the flexible body portion, are subjected to reduced stresses. Since that part of the total load which is attributable to friction has been substantially reduced, it is possible for the bend die and the clamp die to grip securely the tube even though a smaller length of tube is disposed between said dies. Thus, in certain applications, an over-all savings of metal is effected since a smaller length of tube may be installed between the bend die and the clamp die.

Heretofore, a reduction in friction between the surfaces of the mandrel and the tube wall has been effected principally by the use of a lubricant which has been applied on one or both of said surfaces. The use of a lubricant in this manner, although reducing the amount of friction encountered, created additional problems in cleaning both the tube and the mandrel following the draw forming operation. Further, in certain applications, the use of a lubricant in this manner was precluded since such use would result in contaminating the surfaces of the tube wall sufficiently as to preclude their use in the application intended. Additionally, the use of a lubricant in this manner has never been entirely satisfactory due to the inability of maintaining a layer of lubricant of predetermined thickness between the surfaces involved. Further, adequately lubricating the mandrel and the portion to be bent in a long section of tubing is difficult and expensive to accomplish. Cleaning and/or flushing out the excess lubricant is not only time consuming but also expensive.

SUMMARY OF THE INVENTION

It has been found that each of the foregoing disadvantages may be overcome through the use of a mandrel having a roller element mounted for rotation with respect to a part of said mandrel wherein said roller element has a surface portion constructed for engaging at least the inner surface of the outer wall of a tube during the draw forming operation whereby movement of the outer wall during the draw forming operation causes the roller element to rotate about an axis lying in a plane disposed generally perpendicularly to the longitudinal axis of said part of the mandrel.

Accordingly, one of the principal objects of this invention is to provide a mandrel for use in an apparatus for draw forming tubes which, during the draw forming operation, greatly reduces the amount of friction between the surfaces of the mandrel and the walls of the tube being draw formed.

Another object of this invention is to provide an improved mandrel which is easier to load in a tube to be draw formed.

Another object of this invention is to provide an improved mandrel for use in an apparatus for draw forming tubes which, during the draw forming operation, reduces metal work hardening of the tube walls.

Another object of this invention is to provide an improved mandrel for use in an apparatus for draw forming tubes which may be used without applying lubricant to surface portions thereof which causes contamination in the walls of the tube being draw formed due to the lubricant residue left in surface inclusions.

Another object of this invention is to provide an improved mandrel for reducing, during the draw forming operation, the amount of friction required without the use of lubrication or the like.

Another object of this invention is to provide a mandrel of greatly increased longevity.

Another object of this invention is to provide a mandrel which, during the draw forming operation, eliminates galling or spalling.

Another object of this invention is to provide an improved mandrel which is compatible for use with all tubing materials.

Another object of this invention is to provide an improved mandrel for ironing or smoothing out, during the draw forming operation, imperfections in the wall of the tube being draw formed.

Another object of this invention is to provide an improved mandrel which permits, during the draw forming operation, a more even distribution of material flow in the elongation and compression planes of the tube being draw formed.

Another object of this invention is to provide an improved mandrel for use in draw forming tubes having walls of reduced thickness.

Another object of this invention is to provide an improved mandrel which reduces the amount of force required to draw form a tube.

Another object of this invention is to provide an improved plug mandrel.

Another object of this invention is to provide an improved flexible mandrel.

Another object of this invention is to provide an improved mandrel having a flexible body portion comprising a plurality of interconnected laminated ring members.

Another object of this invention is to provide a mandrel for use in an apparatus for draw forming tubes including a roller element mounted for rotation with respect to a part of said mandrel, said roller element having a surface portion constructed for engaging the inner surface of a tube during the draw forming operation whereby movement of the tube wall during the draw forming operation causes the roller element to rotate about an axis lying in a plane disposed generally perpendicularly to the longitudinal axis of said part of said mandrel.

Another object of this invention is to provide an improved mandrel as aforesaid in which a surface portion of said roller element extends radially outwardly from the surface portion of the adjacent mandrel.

Another object of this invention is to provide an improved mandrel including a flexible body portion in which said flexible body portion comprises a plurality of ring members, each ring member including a plurality of roller elements, each roller element of each ring member being mounted for rotation with respect to a part of said ring member and having a surface portion constructed for engaging the inner surface of a tube to be draw formed whereby movement of the tube during the draw forming operation causes said roller elements of each ring member to rotate about an axis lying in a plane disposed generally perpendicularly to the longitudinal axis of said ring member.

Another object of this invention is to provide an improved mandrel having a flexible body portion as aforedescribed in which each ring member comprises a pair of retainer members, said retainer members having a pair of surface portions disposed in abutting engagement, each of said abutting surface portions having a recess formed therein, said recess portions of said abutting surface portions cooperating to form an opening in which is disposed said roller elements.

Another object of this invention is to provide an improved mandrel having a flexible body portion as aforesaid in which said roller elements include a plurality of generally cylindrically shaped members and a plurality of ball members.

Another object of this invention is to provide an improved mandrel as aforedescribed and including a rigid stem portion having a first circumferentially extending groove formed adjacent one end thereof and in which is disposed a plurality of ball members, each of said ball members being mounted within said groove for rotation with respect to said stem portion, each of said ball members having a surface portion extending radially outwardly from the adjacent surface of said mandrel and being constructed for engaging the inner surface of a tube wall during the draw forming operation.

Another object of this invention is to provide an improved mandrel having a flexible body portion as aforedescribed including means for maintaining, during the draw forming operation, a surface portion of each roller element within each ring member in contact with a portion of the inner surface of a tube wall.

Another object of this invention is to provide an improved mandrel having a flexible body portion which includes a plurality of ring members as aforedescribed in which said mandrel includes means for interconnecting adjacent ring members, said interconnecting means including a plurality of link members and a plurality of pin members, each link member comprising a male end and a female end, each of said ends having an opening formed transversely therethrough, the female end of one link member receiving therein a male end of a succeeding link member, each link member being secured to an adjacent link member by a corresponding one of said end members, each link member being disposed within the longitudinally extending opening of a corresponding one of said ring members.

Another object of this invention is to provide an improved mandrel having a flexible body portion in which said flexible body portion comprises a plurality of interconnected laminated ring members, each ring member including a plurality of roller elements, a plurality of link members, and a pin member, said roller element and link members being mounted for rotation about said pin member, each of said link members having a portion extending radially outwardly of the periphery of the roller elements, each radially outwardly extending portion of each link member being mounted for rotation about a pin member of an adjacent ring member.

BRIEF DESCRIPTION OF THE DRAWING

Various other advantages and features of novelty will become apparent as the description proceeds in conjunction with the accompanying drawing, in which.

DESCRIPTION OF THE PREFERRED EMBODIMENT

Referring now to the drawings, in FIGURES 1–10 is shown one embodiment of a mandrel 50 for use in an apparatus for draw forming tubes which is constructed in accordance with the subject invention. The mandrel 50 comprises a rigid stem portion 52, a flexible body portion 54 and means for connecting said flexible body portion 54 to said rigid stem portion 52, said means including a connecting member of mandrel link 56, see also FIGURES 5–7. The means for interconnecting the rigid stem portion 52 and the flexible body portion 54 also includes a draw screw 58.

Figures 1, 2, 3, 4, 5, 6, 7:
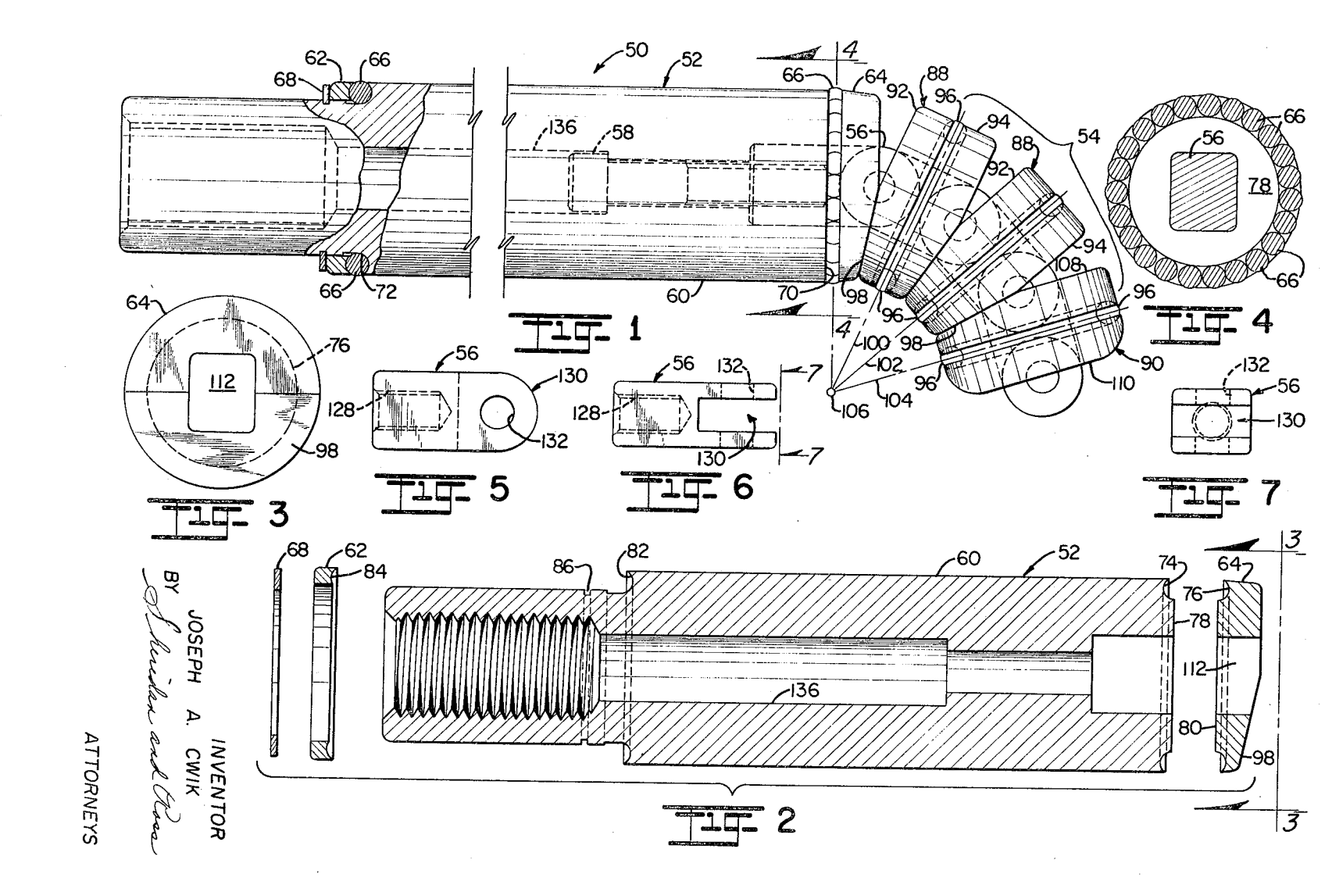
FIGURE 1 is an elevational view, in partial cross section, showing a mandrel constructed in accordance with the subject invention.
FIGURE 2 is an exploded view, in cross section, of some parts of the rigid stem portion of the mandrel shown in FIGURE 1.
FIGURE 3 is an end elevational view taken along line 3—3 of FIGURE 2.
FIGURE 4 is an elevational cross sectional view taken along line 4—4 of FIGURE 1.
FIGURE 5 is an elevational view of a portion of the means for interconnecting the rigid stem portion of the mandrel shown in FIGURE 1 with the flexible body portion of said mandrel.
FIGURE 6 is a plan view of the portion of the interconnecting means shown in FIGURE 5.
FIGURE 7 is an end elevational view taken along line 7—7 of FIGURE 6.

The rigid stem portion 52 includes a longitudinally extending shank member 60, a pair of retainer members 62 and 64, a plurality of ball members 66, and a retaining ring or snap ring 68. The rigid stem portion 52 includes first and second circumferentially extending grooves 70 and 72. Groove 70 is formed adjacent the forward end of the rigid stem portion and positioned to lie within a plane which is disposed perpendicular to the point of tangency of bend. The groove 70 is formed by a pair of recesses 74 and 76. Recess 74 is formed within a first end surface 78 of shank member 60 and recess 76 is formed within one of the end surfaces 80 of the retainer member 64. The first end surface 78 of the shank member 60 is disposed in abutting engagement with the end surface 80 of retainer member 64 and maintained in this position by the means for interconnecting the rigid stem portion 52 and the flexible body portion 54. The groove 72 is formed by a pair of recesses 82 and 84, see FIGURE 2. Recess 82 is formed in a second end surface of shank member 60 and recess 84 is formed in one of the end surfaces of the second retainer member 62. The recess 84 of retainer member 62 is disposed immediately adjacent the recess 82 of the shank member 60 and maintained in this position by the snap ring 68, snap ring 68 being positioned within the circumferentally extendng groove 86 formed on shank member 60, see FIGURE 2. It will be noted that each of the ball members 66 disposed within grooves 70 and 72 have a surface portion thereof extending radially outwardly from the adjacent surface of the rigid stem portion of 52. It will also be noted that each of the ball members of 66 are rotatably mounted within each of the grooves 70 and 72. More specifically, each of the ball members of 66 are mounted such that a surface portion thereof is constructed for engaging the inner surface of the wall of a tube (not shown) during the draw forming operation. The surfaces of the ball members 66 function to position the rigid stem portion 52 generally centrally of the tube to be draw formed and, thus, precludes sliding contact between the inner surface of the tube wall and the outer surface of the shank member 60 and the retainer members 62 and 64.

The flexible body portion 54 includes a plurality of ring members 88 which, except for the end ring member 90, are identical in construction. Each ring member 88 includes a pair of retainer members 92 and 94. The retainer members 92 and 94 are substantially identical in construction to each other and to retainer member 64 of the rigid stem portion 52. The retainer members 92 and 94 have a pair of surface portions, similar to surface portion 80 of retainer member 64, disposed in abutting engagement. Each of said abutting surface portions has a recess, similar to recess 76 of retainer member 64, formed therein. The recess portions of these abutting surface portions cooperate to form an opening or groove in which is disposed the roller elements 96. Each roller element 96 of each ring member is mounted for rotation with respect to a part of said ring member and has a surface portion constructed for engaging the inner surface of a tube (not shown) to be draw formed whereby movement of the tube during the draw forming operation causes said roller elements 96 of each ring member to rotate about an axis lying in a plane disposed generally prependicularly to the longitudinal axis of said ring member. As shown in FIGURE 1, the mandrel 50 includes means for maintaining, during the draw forming operation, a surface portion of each roller element 96 in contact with a portion of the inner surface of a tube wall (not shown). This maintaining means includes an inclined surface portion 98 which is formed upon each ring member's end surface which is itself disposed adjacent an end surface of an adjacent ring member or the adjacent surface of the retainer member 64 of the rigid stem portion 52, and also upon the adjacent end surface of said retainer member 64. When the flexible body portion 54 is formed with inclined surface portions 98 as foresaid, planes which are disposed perpendicularly to the longitudinal axis of each ring member, such as planes represented by the numerals 100, 102 and 104, will meet along a common line, which is represented by numeral 106, when each inclined surface portion 98 is disposed in abutting engagement with an adjacent similarly inclined surface portion. It will be understood that the planes 100, 102 and 104 and line 106 extend perpendicularly into the view of FIGURE 1. It will be understood that the line represented by the numeral 106 also represents the axis or center about which the bend die (not shown) of an apparatus for draw forming tubes rotates. In view of the foregoing, it will be readily appreciated that each of the ring members 88 and 90 are positioned, during the draw forming operation, such that each of the roller elements 96 are disposed and maintained in contact with the adjacent inner surface of the tube wall (not shown) being draw formed and, thus, the inner surface of such a tube does not slideably engage the adjacent surface portions of the retainer members of said ring members. As a result, the amount of friction involved is considerably less than that encountered with most prior art mandrels.

Figures 8, 9, 10, 11, 12, 13, 14, 15, 16, 17:
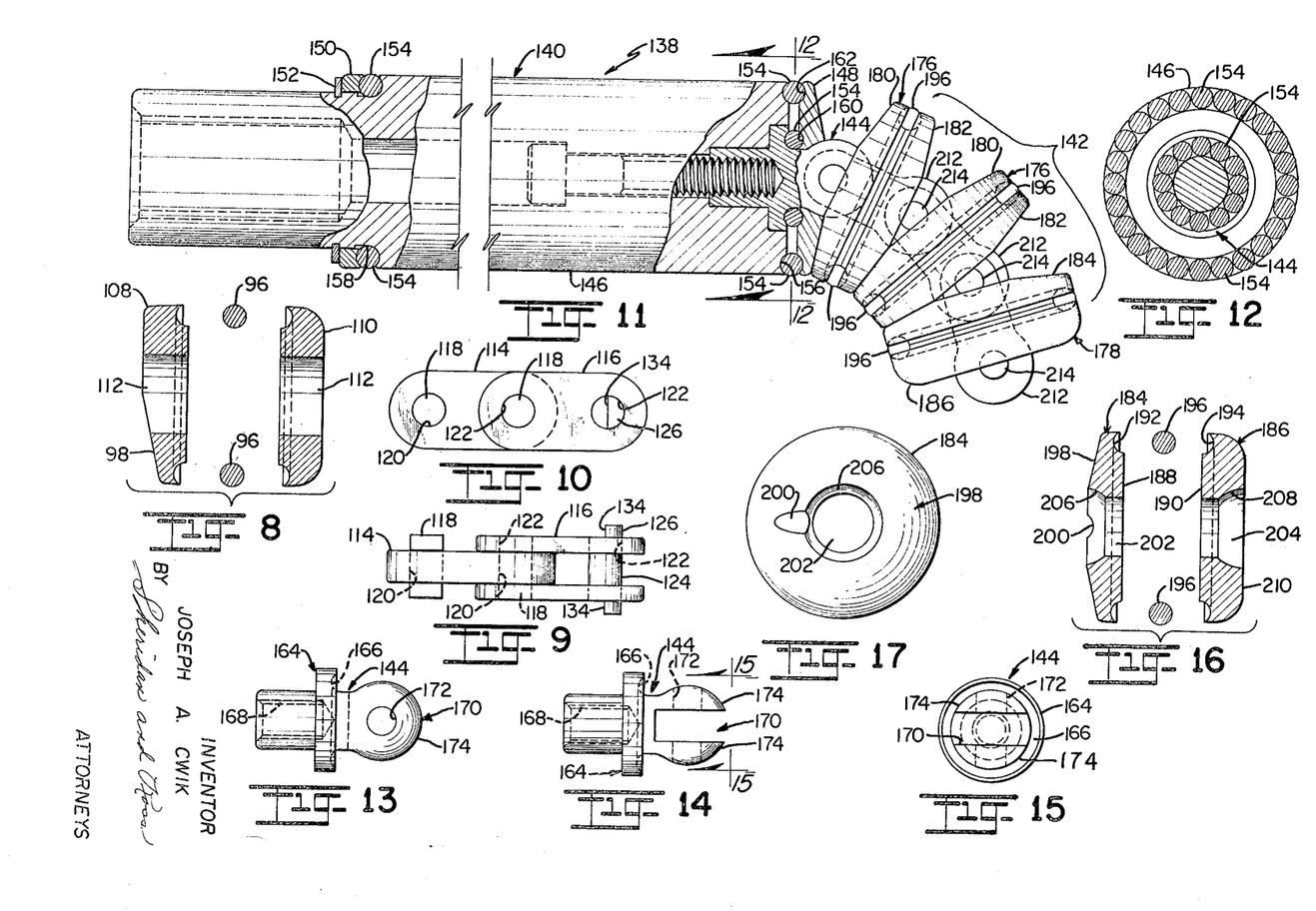
FIGURE 8 is an exploded view, in cross section, of parts of the end ring member of the flexible body portion of the mandrel shown in FIGURE 1.
FIGURE 9 is a plan view of link members used to interconnect the end ring member of the flexible body portion of the mandrel shown in FIGURE 1 with an adjacent ring member.
FIGURE 10 is an elevational view of the link members shown in FIGURE 9.
FIGURE 11 is an elevational view, in partial cross section, showing another embodiment of a mandrel constructed in accordance with the subject invention.
FIGURE 12 is a cross-sectional view taken along line 12—12 of FIGURE 11.
FIGURE 13 is an elevational view of a portion of the means used to interconnect the rigid stem portion of the mandrel shown in FIGURE 11 with the flexible body portion thereof.
FIGURE 14 is a plan view of the portion of the interconnecting means shown in FIGURE 13.
FIGURE 15 is an end elevational view taken along line 15—15 of FIGURE 14.
FIGURE 16 is an exploded view, in cross section, showing parts of one of the ring members included within the flexible body portion of the mandrel shown in FIGURE 11.
FIGURE 17 is an elevational view of one of the retainer link members for the ring member shown in FIGURE 16.

In FIGURE 8 is shown an elevational, exploded view, in cross section, of ring member 90. Ring member 90 includes a pair of retainer members 108 and 110. Retainer member 108 is substantially identical in construction to retainer members 64, 92 and 94. Retainer member 110 is similar in construction to retainer member 108 except that retainer member 110 does not have an inclined surface portion formed on one end thereof such as the surface portion 98 which is formed on one end of retainer member 108. Each of the retainer members 64, 92, 94, 108 and 110 have a rectangularly shaped opening 112 extending longitudinally therethrough. A means for interconnecting adjacent ring members is disposed within the openings 112. This interconnecting means includes a plurality of link members 114 and 116 and a plurality of pin members 118, see also FIGURES 9 and 10. Link member 114 has a pair of openings 120 formed transversely therethrough adjacent each end thereof and link member 116 has a pair of openings 122 formed transversely therethrough adjacent each end thereof. One opening 120 of link member 114 and one opening 122 of an adjacent link member 116 are coaligned. A pin member 118 is mounted within said coaligned openings. Thus, each link member is pivotally interconnected with an adjacent link member. As shown in FIGURES 9 and 10, the end pin member 124 has portions 126 extending longitudinally thereof and disposed in abutting engagement with the adjacent surface portions of retainer member 110. Thus, end pin member 124 prevents the end ring member 90 from becoming separated from the flexible body portion 54.

As previously indicated, the means for interconnecting the rigid stem portion 52 with the flexible body portion 54 includes connector member 56. As shown in FIGURES 5–7, connector member 56 has a longitudinally extending, internally threaded bore 128 formed in one end thereof and a bifurcated portion 130 formed on the other end thereof. An opening 132 is formed transversely through the bifurcated portion 130. The opening 132 is constructed to receive one of the pin members 118 for securing one of the link members with respect to the connecting member 56.

The assembly of mandrel 50 is now described. The shank member 60 is held in a vertical position with the recess 82 opening in an upwardly direction. The recess 82 is filled with a plurality of ball members 66. The retainer member 62 is slipped over the upper end of the shank member 60 and seated with the recess portion 84 thereof in contact with adjacent surface portions of the ball members 66. Then, the snap ring 68 is mounted within the groove 86 thereby securing the ball members 66 within the groove 72 formed by the recesses 82 and 84. A plurality of link members 114 and 116 are pivotally interconnected by means of pin members 118. The end opening 122 of the end link member has the end pin 124 suitably mounted therein, i.e., the flat surface 134 of the longitudinally extending portions 126 of end pin 124 are positioned for abuttingly engaging the end surface of retainer member 110 of ring member 90. The connector member 56 is attached to the other end of the interconnected link members. Ring member 90 is assembled by positioning retainer member 110 with the recess formed in one of its end surfaces opening generally upwardly. Said recess is filled with a plurality of roller elements 96. The retainer member 108 is then positioned upon retainer member 110 recess which is formed in one of its end surfaces disposed in abutting engagement against adjacent surface portions of the roller elements 96. Ring members 88 are assembled in a similar manner as is ring member 90. The retainer member 64 is positioned in much the same manner as retainer member 110 and the recess 76 thereof is filled with roller members 66. Next, the ring elements 90 and 88 and the retainer element 94 are mounted upon the assembled link members and connecting member 56. Then, the shank member 60 is positioned with the recess 74 thereof disposed in abutting engagement against adjacent surface portions of the ball members 66. Then, the draw screw 58 is inserted within the longitudinally extending bore 136 formed in shank member 60. The draw screw 58 is then threaded within the bore 128 of connector member 56 until the retainer member 64 and the flexible body portion 54 are securely attached with respect to the shank member 60. The mandrel 50 is now assembled and ready for use.

Referring again to the drawings, in FIGURES 11–19 is shown another embodiment of a mandrel 138 constructed in accordance with the subject invention. Mandrel 138 comprises a rigid stem portion 140, a flexible body portion 142, and means for interconnecting said flexible body portion 142 to said rigid stem portion 140, said interconnecting means including a connecting member 144, see FIGURES 13 and 14.

The rigid stem portion 140 comprises a shank member 146, first and second retainer members 148 and 150, a retaining ring or snap ring 152, and a plurality of ball members 154. As in the case with mandrel 50 of FIGURE 1, mandrel 138 includes first and second circumferentially extending grooves 156 and 158 in which are rotatably mounted the ball members 154. The grooves 156 and 158 are formed in much the same manner as are the grooves 70 and 72 of the mandrel 50 shown in FIGURE 1 and, thus, further discussion thereof with respect to mandrel 138 is not deemed necessary. The retainer member 148, although generally similar to retainer member 64 of mandrel 50, has a second recess 160 formed in the end surface which also contains a recess 162. The connector member 144 is an elongated member having a peripheral extending flange portion 164 having a recess 166 formed in one surface thereof. The recess 166 of the connector member 144 and the recess 160 of retainer member 148 cooperate to form an opening or groove in which are disposed a plurality of said ball members 154. As shown in FIGURE 11, the opening or groove formed by the cooperating recesses 160 and 166 is disposed radially inwardly of the circumferentially extending groove 156. The purpose of this opening, in which are disposed a plurality of ball members 154, is to facilitate rotation of the retainer member 148 and the flexible body portion 142 relative to the shank member 146.

The connector member 144 has a longitudinally extending, internally threaded bore 168 formed in one end thereof and a bifurcated portion 170 formed at the other end thereof. An opening 172 is formed transversely through said bifurcated portion 170. Each part 174 of the bifurcated portion 170 comprises a segment portion of a spheroid.

The flexible body portion 142 includes a plurality of ring members 176 and 178. The ring members 176 and 178 are generally similar to the ring members 88 and 90 of mandrel 50 although ring members 176 and 178 have been modified in some respects. Ring members 176 comprise a pair of retainer members 180 and 182. Ring member 178 also comprises a pair of retainer members 184 and 186. Retainer members 180 and 182 of ring members 176 are substantially identical in construction with retainer member 184 of end ring member 178. Retainer members 184 and 186 are shown in greater detail in FIGURES 16 and 17. Retainer members 184 and 186 of ring member 178 have a pair of surface portions 188 and 190 disposed in abutting engagement. Each of the abutting surface portions 188 and 190 have a recess 192 and 194 formed therein. The recesses 192 and 194 cooperate to form an opening in which is disposed a plurality of roller elements 196. Retainer element 184 has a conically shaped surface portion 198 formed on one end thereof. A radially extending, arcuately shaped groove 200 is formed within said conically shaped surface portion 198. The purpose for this groove 200 will be later explained. The retainer member 184 has a longitudinally extending opening 202 formed therethrough. The retainer member 186 also has a longitudinally extending opening 204 formed therethrough. When the retainer members 184 and 186 are disposed with the surfaces 188 and 190 in abutting engagement, the openings 202 and 204 cooperate to form an opening in which the central portion thereof is generally cylindrical shaped and the outer surfaces 206 and 208 of each of the end portions of said opening comprise a part of a spherically shaped surface. The diameter of said spherically shaped surface part is larger than the diameter of the central portion of said opening and the centers (not shown) of said spherically shaped surface parts are located externally of said ring member 178. The end surface 210 of retainer member 186 is preferably planar in configuration. As previously indicated, each of the retainer members 180 and 182 of ring members 176 are similar in construction to retainer member 184 of ring member 187 and, thus, further discussion of the features of retainer members 180 and 182 is not deemed necessary. Each of the ring members 176 and 178 has a plurality of roller elements 196 mounted for rotation with respect thereto. Each roller element 196 of each ring member has a surface portion thereof constructed for engaging the inner surface of a tube (not shown) to be draw formed whereby movement of the tube during the draw forming operation causes the roller elements 196 of each ring member to rotate about an axis lying in a plane disposed generally perpendicularly to the longitudinal axis of their respective ring member.

Figure 18:
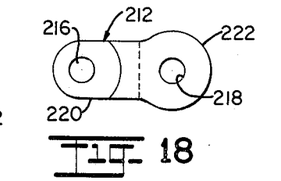
FIGURE 18 is an elevational view of one of the link members used to interconnect adjacent ring members of the flexible body portions of mandrel shown in FIGURE 11.
Figure 19:
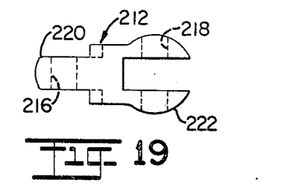
FIGURE 19 is a plan view of the link member shown in FIGURE 18.

The mandrel 138 includes means for interconnecting adjacent ring members. This interconnecting means includes a plurality of link members 212 and a plurality of pin members 214. Each link member 212 comprises an elongated member having an opening 216 and 218 formed transversely therethrough adjacent each end thereof. Each link member 212 has a male end 220 and a female end 222. The female end 222 of one link member receives therein the male end 220 of a succeeding link member. The male end of one link member cooperates with the female end of a succeeding link member to form a portion of a ball-shaped configuration. Portions of the ball-shaped configuration are seated within the spherically shaped surface portions 206 and 208 of the opening formed through each ring member. Thus, each ring member is constructed for gimbal or swivel movement with respect to said portion of said ball-shaped configuration.

The mandrel 138 is assembled in much the same manner as described above with respect to mandrel 50 except for the flexible body portion. The flexible body portion 142 is assembled as follows. The assembled ring member 178 is mounted upon one of the link members 212 to assume the position as shown generally in FIGURE 11. A second link member 212 is positioned with its female end portion 222 encompassing the male end portion 220 of the first link member and with the openings 216 and 218 thereof being aligned with respect to each other. The retainer member 184 of ring member 178 is rotated until the groove 200 is also aligned with the aligned openings 216 and 218. Following this, a pin member 214 is inserted within the aligned groove and openings. Preferably, the pin member 214 is press fit within the aligned openings. Thereafter, the retainer member 184 is rotated until the groove 200 is no longer aligned with the openings 216 and 218. The ring members 176 are mounted upon the link members 212 in a similar fashion. Rotation of retainer member 184 until its groove 200 is no longer aligned with the openings 216 and 218 is preferable but not mandatory since the pin member 214 is press fit within the openings 216 and 218.

Figure 20:
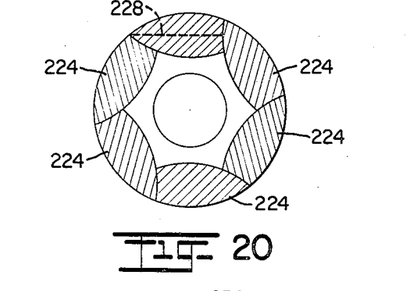
FIGURE 20 is an elevational view, in cross section, of one embodiment of a ring member for use in a flexible body portion of a mandrel constructed in accordance with the subject invention, said view being taken along a plane disposed at a right angle to the longitudinal axis of said ring member.

It is to be understood that the ring members shown in FIGURES 1 and 11 may be modified in a number of ways without departing from the scope of this invention. For example, additional embodiments of different arrangements of the roller elements within such a ring member are shown in FIGURES 20–24 (for round tubing) and FIGURES 25–29 (for square or rectangular-shaped tubing). Each of the views shown in FIGURES 20–29 is taken along a plane disposed perpendicular to the longitudinal axis of the ring member and at the center thereof. In FIGURE 20 is shown a plurality of roller elements 224. Each roller element 224 is generally cylindrically shaped and having, in cross section, a bullet-shaped configuration. Each roller element 224 is mounted within a corresponding recess portion formed within the retainer member 226. Each recess portion has an inner surface which is complemental to the outer surface of the roller element 224. Each roller element 224 has a surface portion thereof disposed radially outwardly of the adjacent surface of the ring member, said surface portion being constructed for engaging the inner surface of a tube (not shown) to be drawn formed whereby movement of the tube during the draw forming operation causes said roller elements to rotate about an axis, such as the axis represented by numeral 228, lying in a plane disposed generally perpendicularly to the longitudinal axis of the ring member. It will be noted that a ring member constructed in accordance with FIGURE 20 results in the roller elements 224 providing a substantially uninterrupted peripheral line of contact with the inner surface of a tube to be draw formed.

Figure 21:
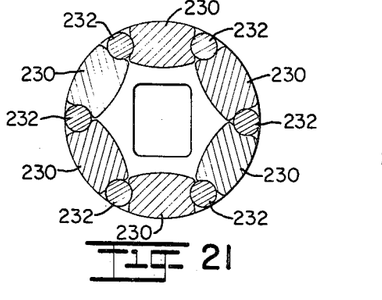
FIGURE 21 is a view similar to that shown in FIGURE 20 showing another embodiment of a ring member.
Figure 22:
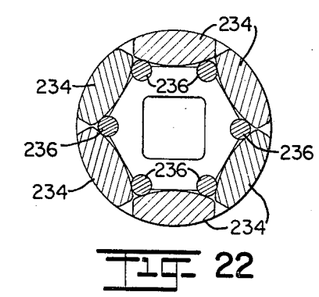
FIGURE 22 is a view similar to that shown in FIGURE 20 showing another embodiment of a ring member.

FIGURES 21 and 22 show two additional modifications of ring members which can be used in mandrels constructed in accordance with the subject invention. In FIGURE 21, the ring member includes a plurality of roller elements comprising a plurality of generally cylindrically shaped members 230 and a plurality of ball members 232. In the ring members shown in FIGURE 21 a ball member 232 is mounted intermediate each generally cylindrically shaped member 230. In the ring member shown in FIGURE 22, said ring member includes a plurality of roller elements comprising a plurality of generally cylindrically shaped members 234 supported upon a plurality of ball members 236. In FIGURE 22, a pair of ball members is shown disposed intermediate each generally cylindrically shaped member 234 and the adjacent part of said ring member.

Figure 23:
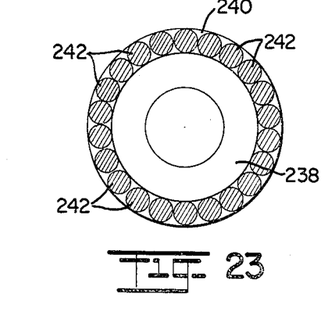
FIGURE 23 is a view similar to that shown in FIGURE 20 showing another embodiment of a ring member.
Figure 24:
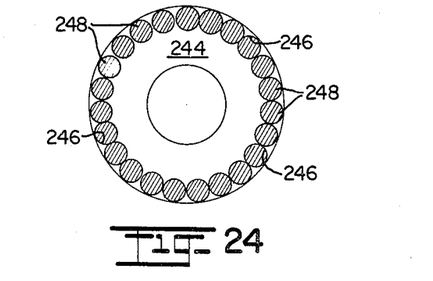
FIGURE 24 is a view similar to that shown in FIGURE 20 showing another embodiment of a ring member.

In FIGURES 23 and 24 are shown two additional embodiments of ring members suitable for use in a mandrel constructed in accordance with the subject invention. In FIGURE 23, the retainer member 238 is constructed with a circumferentially extending recess 240. A plurality of roller elements in the form of ball members 242 is disposed within the recess 240. In FIGURE 24 the ring member includes a retainer member 244 having a plurality of recess portions 246 formed peripherally about said retainer member 244. A roller element in the form of a ball member 248 is disposed within each of said recess portions 246. Since the ball members 248 are individually pocketed within the recess portions 246, it is possible to maintain to a minimum the amount that surface portions of ball members 248 extend radially outwardly from adjacent surface portions of the ring member. Thus, a ring member constructed in accordance with FIGURE 24 would have particular application in draw forming very thin walled tubes.

Figure 25:
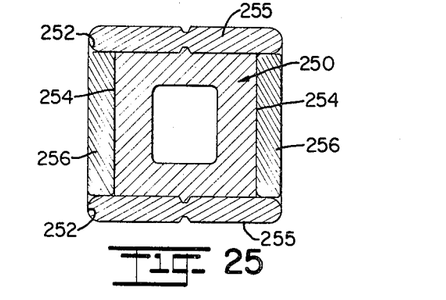
FIGURE 25 is a view similar to that shown in FIGURE 20 showing another embodiment of a ring member.
Figure 26:
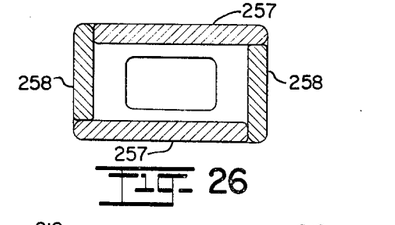
FIGURE 26 is a view similar to that shown in FIGURE 20 showing another embodiment of a ring member.
Figures 27, 28, 29, 30, 31, 32, 33, 34, 35:
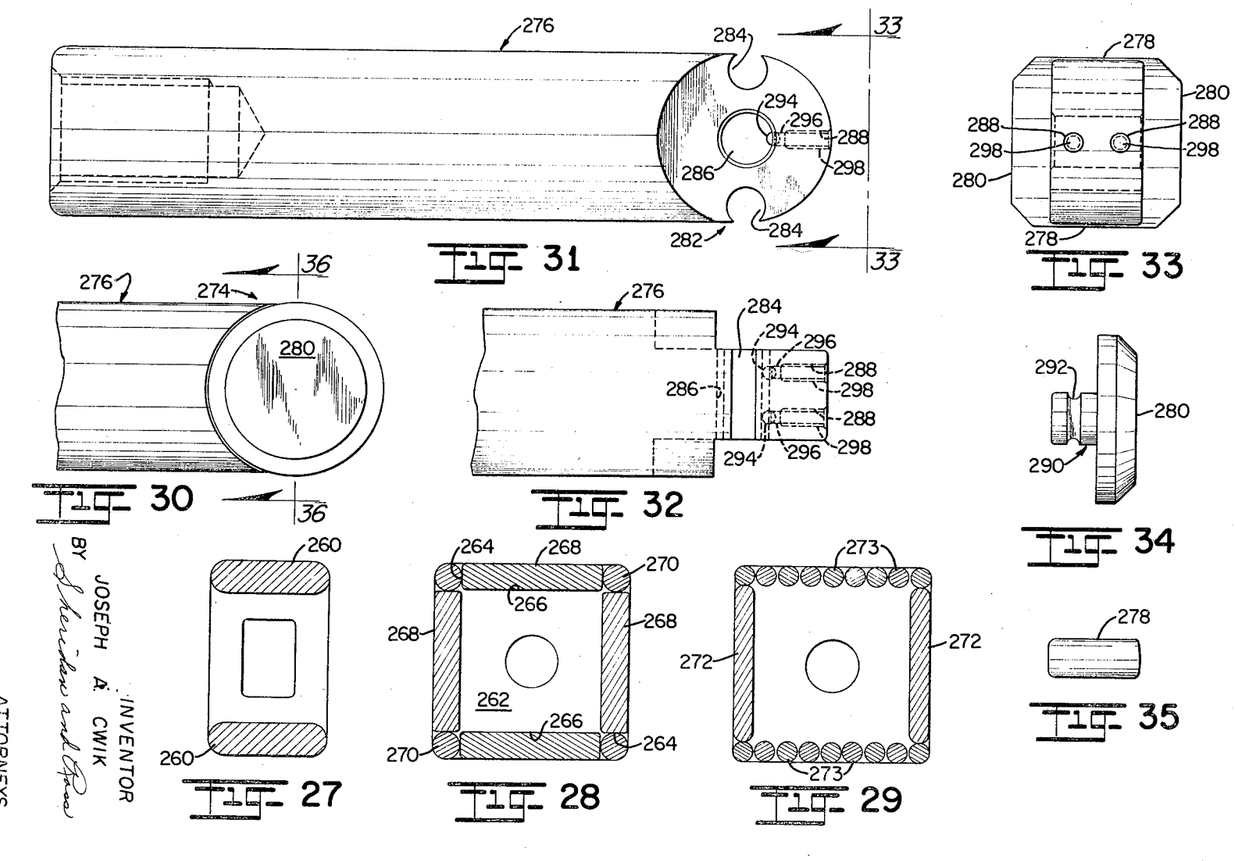
FIGURE 27 is a view similar to that shown in FIGURE 20 showing another embodiment of a ring member.
FIGURE 28 is a view similar to that shown in FIGURE 20 showing another embodiment of a ring member.
FIGURE 29 is a view similar to that shown in FIGURE 20 showing another embodiment of a ring member.
FIGURE 30 is an elevational view of a portion of a plug mandrel constructed in accordance with the subject invention.
FIGURE 31 is an elevational view of the rigid stem portion of the plug mandrel shown in FIGURE 30.
FIGURE 32 is a plan view of a part of the rigid stem portion shown in FIGURE 31.
FIGURE 33 is an end elevational view taken along line 33—33 of FIGURE 31.
FIGURE 34 is an end elevational view of one of the roller members shown in FIGURE 30.
FIGURE 35 is a front elevational view of one of the roller elements used in the mandrel shown in FIGURE 36.

As previously indicated, the ring members shown generally in FIGURES 25–29 are constructed for use with square or rectangularly shaped tubing. However, the principle is the same as is the case with round tubing, i.e., each ring member includes a plurality of roller elements each of which is mounted for rotation with respect to a part of said ring member and each of which has a surface portion constructed for engaging the inner surface of a tube (not shown) to be draw formed whereby movement of the tube during the draw forming operation causes said roller elements to rotate about an axis lying in a plane disposed generally perpendicularly to the longitudinal axis of the ring member. In FIGURE 25 is shown a retainer member 250 having a plurality of recess portions 252 and 254 formed therein. Roller elements in the form of generally cylindrically shaped members 255 and 256 are disposed respectively within said recess portions 252 and 254. The ring member shown in FIGURE 26 is similar to that shown in FIGURE 25 except for the cross-sectional dimensions and the relative positioning of the roller members which are in the form of generally cylindrically shaped members 257 and 258. The ring member shown in FIGURE 27 is similar to the ring member shown in FIGURES 25 and 26 except that the ring member shown in FIGURE 27 includes only a pair of roller elements in the form of generally cylindrically shaped members 260, one of which is disposed to contact the inner surface of the outer wall of a tube (not shown) to be draw formed and the other one of which is disposed to contact the inner surface of the inner wall of a tube to be draw formed. The ring member shown in FIGURE 27 does not include rotatably mounted members which have a surface portion thereof constructed for engaging either the upper or the lower radially extending walls of a tube to be draw formed.

In FIGURES 28 and 29 are shown modifications of the ring members shown generally in FIGURES 25 and 26. In FIGURE 28, the ring member has a retainer member 262 in which is formed a plurality of recess portions 264 and 266. A roller element either in the form of a generally cylindrically shaped member 268 or a ball member 270 is disposed within each of the recess portions 264 and 266. In FIGURE 29 is shown a ring member similar to that shown in FIGURE 28 except that only a pair of roller elements in the form of a generally cylindrically shaped member 272 is used in lieu of the four cylindrically shaped members 268 shown in FIGURE 28. In addition, a plurality of roller elements in the form of ball members 273 is used as shown. It is to be understood that the ball members 273 may be disposed within a longitudinally extending recess or individually pocketed within recess portions.

In FIGURES 30–36 is shown another mandrel 274 constructed in accordance with this invention, mandrel 274 being more appropriately designated as a plug-type mandrel. Mandrel 274 comprises a rigid stem portion 276, a pair of roller elements 278 (see FIGURES 35 and 36), a pair of roller members 280, and means for securing said roller members 280 to said rigid stem portion 276 to permit rotation of said roller members relative to said rigid stem portion.

The rigid stem portion 276 has a male part 282, which is generally cylindrical in shape, formed adjacent one end thereof and extending longitudinally thereof. The longitudinal axis of said male part 282 is disposed at a right angle to the longitudinal axis of said rigid stem portion 276. The width of the male part 282 is less than the width of the remaining rigid stem portion 276. The male part has a pair of recesses 284 and a cylindrically shaped opening 286 formed transversely therethrough. The longitudinal axis of said recesses 284 and said opening 286 lie within a plane disposed generally perpendicularly to the longitudinal axis of said male part. The longitudinal axis of said opening 286 is disposed centrally of the longitudinal axis of said recesses 284. The male part 282 also includes a pair of openings 288 extending longitudinally thereof between said transversely extending opening 286 and the end of said male part 282.

Figure 36:
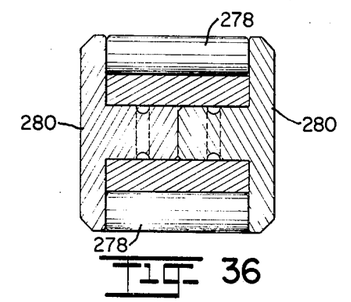
FIGURE 36 is an elevational view, in cross section, taken along line 36—36 of FIGURE 30.

Each roller element 278 is mounted within a corresponding one of said recesses 284 for rotation with respect thereto. Each roller element 278, when mounted within one of said recesses 284, has a surface portion thereof extending radially outwardly from the adjacent surface of said male part 282.

Each roller member 280 has a cylindrical shaped portion 290 extending longitudinally one side thereof. Each roller member 280 is disposed adjacent one side of said generally cylindrically shaped male part 282 with the cylindrically shaped portion 290 thereof disposed within the cylindrically shaped opening 286 of said male part 282. Each cylindrically shaped portion 290 has a circumferentially extending groove 292 formed thereon. The combined thicknesses of said roller members 280 and the width of said male part 282 is substantially equal to the width of the remaining part of said rigid stem portion 276. The means for securing said roller members to said male part includes a pair of ball members 294, only one of which is shown in FIGURE 31. Each of said ball members 294 is disposed within a corresponding one of the longitudinally extending openings 288 formed in said male part 282. In the mandrel's assembled condition, each ball member 294 has a surface portion thereof disposed within the circumferentially extending groove 292 of a corresponding one of the cylindrically shaped portions 290 of one of said roller members 280. Said securing means also includes a seat 296 for each of said ball members 294. Each seat is disposed in abutting contact with a surface portion of a corresponding one of said ball members. Said securing means also includes means, such as a set screw 298, for securing said ball member 294 and the seat 296 therefor within said longitudinally extending opening 288.

Figure 37:
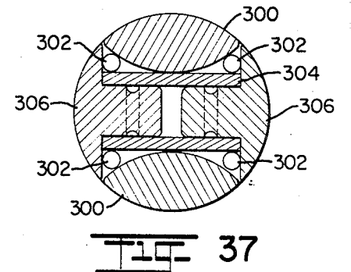
FIGURE 37 is a view similar to the view of FIGURE 36 showing another embodiment of the roller element of a plug mandrel constructed in accordance with the subject invention.

In FIGURE 37 is shown a view similar to that shown in FIGURE 36 except that the mandrel shown in FIGURE 37 is constructed for use with round tubing. In FIGURE 37, the roller elements 300 are, in cross section, generally oval in configuration. Additionally, at least a pair of ball members 302 is disposed intermediate each roller element 300 and the adjacent male part 304. It is preferred that four ball members 302 be disposed intermediate each roller element 300 and the adjacent male part 304. The roller members 306 are similar in construction to the roller members 280 except that the external surface thereof is constructed to conform to the inner surface of a round tube.

Figure 38:
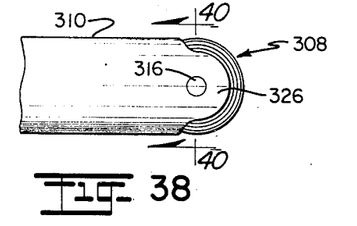
FIGURE 38 is an elevational view of a portion of another embodiment of a mandrel constructed in accordance with the subject invention.
Figure 39:
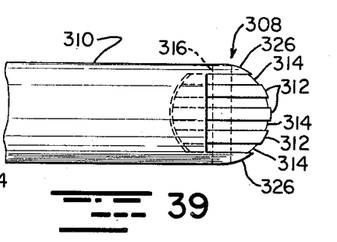
FIGURE 39 is a plan view of a part of the mandrel shown in FIGURE 38.
Figure 40:
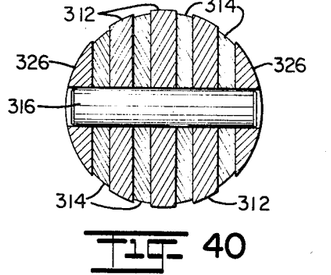
FIGURE 40 is an elevational view, in cross section, taken along line 40—40 of FIGURE 38.

In FIGURES 38–40 is shown another embodiment of a mandrel 308 constructed in accordance with the subject invention. The mandrel 308 includes a rigid stem portion 310, a plurality of roller elements 312, a plurality of spacer members 314, and a pin 316 for securing said roller elements 312 and said spacer members 314 with respect to said rigid stem portion 310. Each roller element 312 is disposed intermediate adjacent spacer members 314. The roller elements 312 and the spacer members 314 are mounted for rotation relative to said pin 316. Preferably, the spacer members 314 are formed from a material having a relatively low coefficient of friction. The roller elements 312 extend radially outwardly of the periphery of the spacer members 314. It is to be understood that the spacer members 314 may have a considerably smaller diameter than the adjacent roller elements 312 and that a plurality of ball members (not shown) may then be disposed intermediate adjacent roller elements 312 and be positioned radially outwardly of each of said spacer members 314. In this case, opposed surface portions of the roller elements 312 will be appropriately recessed for receiving and holding said ball members. It will also be understood that the spacer members 314 can be formed as an integral part of said rigid stem portion 310. Further, at least a pair of said spacer members 314 can be replaced by a pair of elongated link members (not shown) for the purpose of connecting the pin of a ring member (not shown) to the pin 316. In this event, the mandrel 308 would then be converted from a plug-type mandrel to a mandrel having a flexible portion.

Figures 41, 42:
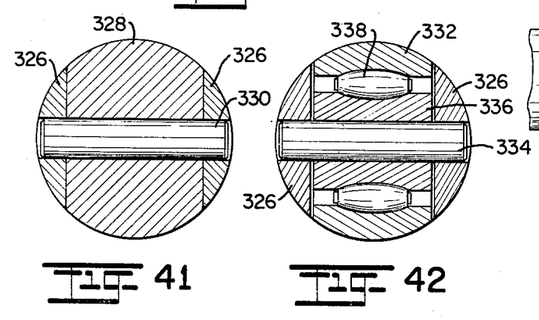
FIGURE 41 is a view similar to the view of FIGURE 40 showing the mounting of another roller element in a rigid stem portion similar to that shown in FIGURE 39.
FIGURE 42 is a view similar to that shown in FIGURE 40 showing the mounting of another roller element in a rigid stem portion similar to that shown in FIGURE 39.
Figure 43:
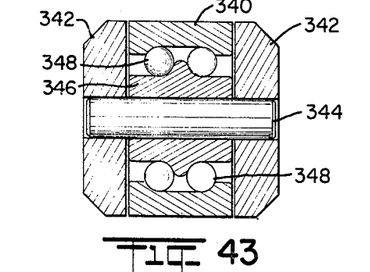
FIGURE 43 is a view similar to the view of FIGURE 40 except that the construction shown is for use with square or rectangular tubes.

The rigid stem portion 310 as shown in FIGURE 39 may also be used in combination with either of the roller elements shown in FIGURES 41 and 42 to form a plug-type mandrel constructed in accordance with the subject invention. For example, a plug-type mandrel may be constructed in accordance with the subject invention in which a single roller element 328 (see FIGURE 41) is mounted between the side walls 326 of the rigid stem portion 310 as shown in FIGURE 39. A pin member 330 secures the roller element 328 to the rigid stem portion 310. A modified plug mandrel may be constructed in accordance with this invention by mounting a roller element 332 as shown in FIGURE 42 between the side walls 326 of the rigid stem portion 310 shown in FIGURE 39. The roller element 332 is supported for rotation by a pin member 334, an annular member 336 and a plurality of bearings 338. The bearings 338 are disposed intermediate said roller element 332 and said annular member 336. The annular member 336 is mounted directly upon the pin member 334.

Where the rigid stem portion 310, as shown in FIGURE 39, is suitably constructed for use with square or rectangular shaped tubing, a plug mandrel may be constructed having a rigid stem portion similar to rigid stem portion 310 (with obvious changes being made in the external configuration thereof) and utilizing the roller element 340 shown in FIGURE 43. In FIGURE 43 the roller element 340 is mounted between side walls 342. Additionally, the roller element 340 is mounted for rotation upon the pin member 344 and is supported upon said pin member 344 by an annular member 346 and a plurality of bearings 348 which are disposed intermediate said roller element 340 and said annular member 346.

Figure 44:
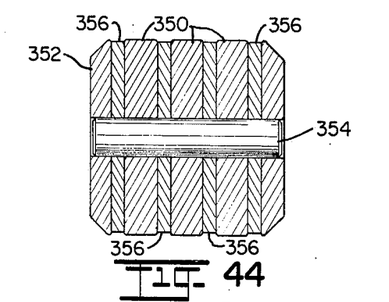
FIGURE 44 is a view similar to that of FIGURE 43.

In FIGURE 44 is shown a view similar to that shown in FIGURE 40. More specifically, the construction shown in FIGURE 44 may be used either with a plug-type mandrel or with a flexible-type mandrel constructed in accordance with the subject invention. In FIGURE 44, a plurality of roller elements 350 is mounted intermediate a pair of side walls 352 which are similar to side walls 326 (with appropriate modification in configuration) as shown in FIGURE 39. The roller elements 350 are supported between said side wall 352 by means of a pin member 354. A plurality of members 356 is also mounted on a pin member 354 and disposed intermediate adjacent roller elements 350. Said members 356 may be spacer members or portions of a link member similar to the link member described in connection with the mandrel 308. Where the members 356 are used merely as spacer members, it will be noted that the roller elements 350 have surface portions thereof extending radially outwardly from the adjacent periphery of said spacer members 356.

In view of the foregoing, it will now be readily appreciated that a vastly improved mandrel for use in an apparatus for draw forming tube has been described which substantially eliminates the existence of static friction between the surfaces of the mandrel and the tube being draw formed. The elimination of static friction is accomplished through the use of a mandrel having a roller element mounted therein for rotation with respect to a part of said mandrel wherein said roller element has a surface portion constructed for engaging the inner surface of the tube during the draw forming operation whereby movement of the tube during the draw forming operation causes the roller element to rotate about an axis lying in a plane disposed generally perpendicularly to the longitudinal axis of said mandrel. Reduction or elimination of static friction increases the longevity of the mandrel, permits draw forming to be performed at an increased rate, and results in a saving of material since the length of tubing to be disposed between the clamp and bend dies is less than that formerly required. A mandrel constructed in accordance with the subject invention may be used for a variety of shapes, configurations and sizes of tubing and has particular application for thin wall tubing which is difficult to work with under the best of conditions. Further, a mandrel constructed in accordance with the subject invention eliminates the contamination and cleaning problem heretofore encountered in the use of a lubricant for the purpose of minimizing friction between the sliding surfaces of the mandrel and the tube wall.

It is to be understood that this invention is not limited to the exact embodiments of the devices shown, which are merely by way of illustration and not limitation, as various other forms and modifications will be apparent to those skilled in the art; and it is therefore intended that the appended claims cover all such changes and modifications.

What is claimed is:

1. A mandrel for use in an apparatus for draw forming tubes, said mandrel comprising: a rigid stem portion having a longitudinal axis and having a female socket portion formed in one end thereof, said female socket portion being circumscribed by a pair of spaced-apart side walls, each of said side walls having an opening formed therethrough, the opening formed in one of said side walls being co-aligned with the opening formed through the other of said side walls; the axis of said openings extending perpendicular to and intersecting the axis of said stem portion; pin means disposed within said aligned openings; and a single roller element mounted on said pin means within said female socket portion intermediate said side walls for rotation relative thereto and being centered on the axis of the stem portion, said roller element having a surface portion extending outward beyond the adjacent surface of said mandrel both laterally and forwardly.

2. A mandrel as described in claim 1 including an annular member and a plurality of ball members, said annular member being mounted upon said pin means, and said ball members being disposed intermediate said annular member and said roller element, said roller element being supported upon said pin means by said ball members and said annular member.

3. A mandrel for use in an apparatus for draw forming tubes, said mandrel comprising: a rigid stem portion; a flexible body portion; and means for connecting said flexible body portion to said rigid stem portion; said flexible body portion including a plurality of ring members, each ring member including a plurality of roller elements, each roller element of each ring member being mounted for rotation with respect to a part of said ring member and having a surface portion constructed for engaging the inner surface of a tube to be draw formed whereby movement of the tube during the draw forming operation causes said roller elements of each ring member to rotate about an axis lying in a plane disposed generally perpendicularly to the longitudinal axis of said ring member.

4. A mandrel as described in claim 3 in which each ring member includes a pair of retainer members, said retainer members having a pair of surface portions disposed in abutting engagement, each of said abutting surface portions having a recess formed therein, said recess of said abutting surface portions of said retainer members cooperating to form an opening in which is disposed said roller elements.

5. A mandrel as described in claim 3, in which each ring member includes a pair of retainer members, said retainer members having a pair of surface portions disposed in abutting engagement, each of said abutting surface portions having a plurality of recess portions formed therein, said recess portions of said abutting surface portions of said retainer members cooperating to form an opening in which is disposed a corresponding one of said roller elements.

6. A mandrel as described in claim 3 in which said roller elements include a plurality of generally cylindrically shaped members and a plurality of ball members.

7. A mandrel as described in claim 6 in which a ball member is mounted intermediate the ends of adjacent cylindrically shaped members.

8. A mandrel as described in claim 6 in which a pair of ball members is mounted intermediate each generally cylindrically shaped members and the adjacent part of each ring member.

9. A mandrel as described in claim 6 in which each ring member includes a pair of retainer members, said retainer members having a pair of surface portions disposed in abutting engagement, each of said abutting surface portions having a plurality of recess portions formed therein, each recess portion of one of said abutting surface portions cooperating with a corresponding recess portion of the other of said abutting surface portions to form an opening in which is disposed a corresponding one of either of said generally cylindrically shaped members or said ball members.

10. A mandrel as described in claim 9 in which a ball member is disposed intermediate the ends of the adjacent generally cylindrically shaped members.

11. A mandrel as described in claim 3 in which said rigid stem portion includes a first circumferentially extending groove formed adjacent one end thereof and a plurality of ball members disposed within said groove, each of said ball members being mounted within said groove for rotation with respect to said stem portion, each of said ball members having a surface portion extending radially outwardly from the adjacent surface of said mandrel and being constructed for engaging the inner surface of a tube wall during the draw forming operation.

12. A mandrel as described in claim 11 in which said rigid stem portion includes a shank member having a first end surface and a first retainer member having a surface disposed in abutting engagement with said end surface, each of said abutting surfaces having a recess formed therein, said recesses cooperating to form said circumferentially extending groove.

13. A mandrel as described in claim 12 in which each of said abutting surface portions has a second recess formed therein, said second recess being disposed intermediate said other recess and the center of said rigid stem portion, said second recesses of said abutting surface portions cooperating to form an opening in which is disposed a plurality of ball members.

14. A mandrel as described in claim 11 in which said rigid stem portion also includes a second circumferentially extending groove formed adjacent the other end of said stem portion and a plurality of ball members disposed within said groove, each of said ball members being mounted within said second groove for rotation with respect to said stem portion, each of said ball members having a surface portion extending radially outwardly from the adjacent surface of said stem portion and being constructed for engaging the inner surface of a tube wall during the draw forming operation.

15. A mandrel as described in claim 14 in which said rigid stem portion includes a second end surface, a second retainer member having a surface disposed adjacent said end surface, and means for maintaining one of said surfaces in juxtaposition to the other of said surfaces, each of said abutting surfaces having a recess formed therein, said recesses cooperating to form said second circumferentially extending groove.

16. A mandrel as described in claim 3 in which said mandrel includes means for maintaining, during the draw forming operation, a surface portion of each roller element in contact with a portion of the inner surface of a tube wall.

17. A mandrel as described in claim 16 in which said maintaining means includes an inclined surface portion formed upon each of the end surfaces of each ring member which is disposed adjacent an end surface of an adjacent ring member or the adjacent surface of the rigid stem portion, and upon the end surface of the adjacent rigid stem portion whereby planes which are disposed perpendicularly to the longitudinal axis of each ring member will meet along a common line when each said inclined surface portion is disposed in abutting engagement with an adjacent inclined surface portion.

18. A mandrel as described in claim 3 in which each ring member has an opening extending longitudinally thereof, and in which said mandrel includes means for interconnecting adjacent ring members, said interconnecting means including a plurality of link members and a plurality of pin members, each link member comprising an elongated member having an opening formed transversely therethrough, adjacent each end thereof, each link member being secured to an adjacent link member by a corresponding one of said pin members, each link member being disposed within the longitudinally extending opening of a corresponding one of said ring members.

19. A mandrel as described in claim 3 in which each ring member has an opening extending longitudinally thereof, the central portion of said opening being generally cylindrically shaped and the inner surface of each end portion of said opening comprising a part of a spherically shaped surface, the diameter of said spherically shaped surface part being larger than the diameter of said central portion and the centers of said spherically shaped surface parts being located externally of said ring member; said mandrel including means for interconnecting said ring members, said means including a plurality of link members and a plurality of pin members, each link member comprising an elongated member having a male and a female end, each of said ends having an opening formed transversely therethrough, the female end of one link member receiving the male end of a succeeding link member, one link member being secured to an adjacent link member by a corresponding one of said pin members, the male end of one link member cooperating with the female end of a succeeding link member to form the major portion of a ball shaped configuration, a portion of said ball shaped configuration being seated within the spherically shaped surface portion of one of said ring members and another portion of said ball shaped configuration being seated within the spherically shaped surface portion of an adjacent ring member.

20. In a mandrel for use in an apparatus for draw forming tubes, a roller element mounted for rotation with respect to a part of said mandrel, said roller element having a surface portion constructed for engaging the inner surface of the outer wall of a tube during the draw forming operation whereby movement of the outer wall during the draw forming operation causes the roller element to rotate about an axis lying in a plane disposed generally perpendicularly to the longitudinal axis of said part of said mandrel; and including a pair of roller members, said roller element being disposed intermediate said pair of roller members, said pair of roller members each being mounted for rotation with respect to a portion of said mandrel about an axis lying in a plane disposed generally perpendicularly to the longitudinal axis of said part of said mandrel.

21. In a mandrel as described in claim 20 including a second roller element, said second roller element being mounted for rotation with respect to said mandrel between said roller members and having a surface portion constructed for engaging the inner surface of the inner wall of a tube during the draw forming operation whereby movement of the tube during the draw forming operation causes the second roller element to rotate about an axis lying in a plane disposed generally perpendicularly to the longitudinal axis of said mandrel.

22. In a mandrel as described in claim 20 including a plurality of bearings, said bearings being disposed intermediate said roller element and said mandrel.

23. In a mandrel as described in claim 21 including a pair of roller members, each of said roller elements being disposed intermediate said roller members, said pair of roller members being mounted for rotation with respect to said mandel about an axis lying in a plane disposed generally perpendicularly to the longitudinal axis of said mandrel.

24. A mandrel for use in an apparatus for draw forming tubes, said mandrel comprising: a rigid stem portion having a longitudinal axis; an integral boss extending from one end of said stem portion and having a thickness in at least one lateral direction substantially less than the corresponding thickness of the stem portion; a bearing bore extending through the thickness of the boss perpendicular to the longitudinal axis of the stem portion and substantially intersecting said axis; a bearing recess extending through the thickness of the boss spaced to each side of the bore and parallel thereto; the axes of the bore and recesses all lying in a plane perpendicular to the axis of the stem portion; the outer longitudinal edges of said recesses being open and adjacent to the side walls of the stem portion; an elongate roller element mounted for rotation in each of said recesses with a surface portion extending radially outward from the adjacent surface of the boss; a pair of roller members each having a central axle extending into said bore from opposite ends to mount said roller members for rotation in axially spaced relation; the outer contours of said roller elements and roller members in assembled relation combining to correspond to the cross sectional contour of the stem portion.

25. A mandrel as claimed in claim 24; each of said bearing recesses being substantially cylindrical; and each of said roller elements being substantially cylindrical and sized to rotate freely in its respective recess.

26. A mandrel as claimed in claim 24; each of said bearing recesses being generally channel shaped in cross section; and each of said roller elements being of oval configuration in longitudinal cross section; and bearing members in each recess at the ends thereof to support the ends of said roller elements.

27. A mandrel as claimed in claim 24; the peripheral margins of said roller members overlying the ends of said roller elements to retain the latter in their recesses; and means carried by said boss in engagement with said axles to retain the axles in the bore.

28. A mandrel for use in an apparatus for draw forming tubes, said mandrel comprising: a rigid stem portion having a female socket portion formed in one end thereof, said female socket portion being circumscribed by a pair of spaced-apart side walls, each of said side walls having an opening formed therethrough, the opening formed in one of said side walls being co-aligned with the opening formed through the other of said side walls; pin means disposed within said aligned openings; and a laminated roller element mounted within said female socket portion intermediate said side walls for rotation relative thereto; said roller elements comprising a plurality of discrete disc-like members each individually mounted on said pin means for rotation independently of each other; the assembly of said members presenting a contour having a surface portion extending outwardly beyond the adjacent surface of said mandrel both laterally and forwardly.

References Cited

UNITED STATES PATENTS

| | | | |
|---|---|---|---|
| 246,346 | 8/1881 | Scheermesser | 72—75 |
| 331,570 | 12/1885 | Tasker | 72—113 |
| 743,287 | 11/1903 | Hunker | 72—75 |
| 1,010,954 | 12/1911 | Rasmussen et al. | 72—75 |
| 1,279,130 | 9/1918 | Leonard et al. | 72—75 |
| 1,389,856 | 9/1921 | Brinkman | 72—466 |

CHARLES W. LANHAM, Primary Examiner

L. A. LARSON, Assistant Examiner

U.S. Cl. X.R.

72—75, 283, 466